US011577678B1

(12) United States Patent
Hunter

(10) Patent No.: US 11,577,678 B1
(45) Date of Patent: Feb. 14, 2023

(54) AIR BAG MODULE, MONITORING APPARATUS FOR SUPPLEMENTAL RESTRAINT SYSTEM, AND METHOD

(71) Applicant: Honda Motor Co., Ltd., Tokyo (JP)

(72) Inventor: Scott Allen Hunter, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/549,250

(22) Filed: Dec. 13, 2021

(51) Int. Cl.
*B60R 21/205* (2011.01)
*B60R 21/01* (2006.01)
*B60R 21/017* (2006.01)

(52) U.S. Cl.
CPC .......... *B60R 21/01* (2013.01); *B60R 21/0173* (2013.01); *B60R 21/205* (2013.01); *B60R 2021/01231* (2013.01)

(58) Field of Classification Search
CPC ... B60R 21/01; B60R 21/0173; B60R 21/205; B60R 2021/01231
See application file for complete search history.

(56) References Cited

U.S. PATENT DOCUMENTS

2019/0152417 A1    5/2019   Nishimura et al.

FOREIGN PATENT DOCUMENTS

| DE | 102017202506 A1 | 8/2018 |
| EP | 0612643 B1 | 10/1997 |
| JP | 2018016298 A | 2/2018 |
| KR | 20050070357 A | 7/2005 |

*Primary Examiner* — Mathew Franklin Gordon
(74) *Attorney, Agent, or Firm* — Kenealy Vaidya LLP

(57) ABSTRACT

An airbag module for a supplemental restraint system of a vehicle can include an inflator, an airbag attached to the inflator and in fluid communication with the inflator; and a module controller mounted to the inflator. The module controller can be configured to: determine an elapsed service time of the inflator based on the identification information of the vehicle; compare the elapsed service time to a first time threshold; and output a disable signal to the SRS controller commanding the SRS controller to disable a firing pulse for the inflator when the elapsed service time is greater than or equal to the first time threshold.

20 Claims, 5 Drawing Sheets

AIR BAG MODULE, MONITORING APPARATUS FOR SUPPLEMENTAL RESTRAINT SYSTEM, AND METHOD

BACKGROUND

The disclosed subject matter relates to an airbag module for a vehicle. More particularly, the disclosed subject matter relates to methods and apparatus that monitor an inflator of an airbag module based on vehicle identification information (VIN).

A vehicle can include a plurality of restraints such as but not limited to seat belts and airbags. Each seat belt can include a pretensioner. The pretensioners and the airbags can be referred to individually or collectively as a supplemental restraint system ("SRS"). The pretensioner and the airbag can include an inflator, which is a pyrotechnic device that relies on propellant to generate gas. In the pretensioner, the gas drives a piston which pulls on the buckle of the seat belt during an impact event. In an airbag, the gas expands and fills a cushion during an impact event. The airbag can be mounted in any appropriate location inside the vehicle such as but not limited to the steering wheel, the instrument panel, a pillar, the side bolster of a seat, etc. The SRS can also include one or more sensors and a SRS controller that is configured to process data received from the sensor(s) and output a firing pulse to the inflator of appropriate one(s) of the pretensioner(s) and the airbag(s).

An inflation event can occur when a vehicle impacts or is impacted by an external object. Immediately preceding or during an impact, the sensor(s) in the vehicle can measure sudden changes in acceleration and/or force. When the SRS controller determines the sudden change reaches or exceeds a predetermined threshold, the SRS controller can initiate the tightening of the seat belt and inflation of the airbag by sending a firing pulses to the inflators of the pretensioner and the airbag. Upon receiving the firing pulse, the inflators can ignite the propellant and tighten the seat belt and inflate the airbag.

SUMMARY

Some embodiments are directed to an airbag module for a supplemental restraint system of a vehicle. The vehicle can have identification information. The supplemental restraint system can have a SRS controller. The airbag module can include an inflator, an air bag and a module controller. The airbag can be attached to the inflator and in fluid communication with the inflator. The module controller can be mounted to the inflator. The module controller can be configured to: determine an elapsed service time of the inflator based on the identification information of the vehicle; compare the elapsed service time to a first time threshold; and output a disable signal to the SRS controller commanding the SRS controller to disable output of a firing pulse for the inflator when the elapsed service time is greater than or equal to the first time threshold.

Some embodiments are directed to a monitoring apparatus for a supplemental restraint system for a vehicle. The vehicle can include a communication network and identification information. The monitoring apparatus can include an inflator; an airbag, a SRS controller and a module controller. The airbag can be attached to the inflator and in fluid communication with the inflator. The SRS controller can be in electrical communication with the inflator and configured to: determine an inflation event based on an impact sensor data; and output a firing pulse to the inflator when the inflation event is determined. The module controller can be mounted to the inflator and in electrical communication with the SRS controller through the communication network. The module controller configured to: determine an elapsed service time of the inflator based on the identification information of the vehicle; compare the elapsed service time to a first time threshold; and output a disable signal to the SRS controller commanding the SRS controller to disable output of the firing pulse for the inflator when the elapsed service time is greater than or equal to the first time threshold.

Some embodiments are directed to a method of determining the state of an inflator of a supplemental restraint in a vehicle. The vehicle can have identification information. The method can include: determining an elapsed service time of the inflator based on the identification information of the vehicle; comparing the elapsed service time to a first time threshold; and outputting a disable signal to an SRS controller commanding the SRS controller to disable a firing pulse for the inflator when the elapsed service time is greater than or equal to the first time threshold.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

The propellant in pyrotechnic airbag devices can rely on a degree of chemical and/or structural stability which allows for gas generation and inflation of a cushion that is predictable and desirable. It is possible for the chemical propellant to age over time and in response to environmental conditions such as but not limited to temperature and humidity. Degradation of the propellant can cause the burning characteristics and gas generation by the inflator to vary from the predictable and desired characteristics, resulting in non-optimal operation of an airbag performance. Life expectancy of airbag inflators generally exceeds the life expectancy of vehicles. As vehicles meet their end-of-life usage and are sent to scrapyards, degraded propellant can be avoided with simultaneous scrapping of airbag components.

It is possible for a vehicle owner to replace a spent airbag module with an airbag module from a different vehicle. The donor vehicle can be older than the recipient vehicle. Thus, it can be advantageous to verify the age of the airbag module and notify the owner and/or disable the airbag function after a specified period of usage condition or post-installation time.

In some cases, vehicles may vastly exceed their expected end-of-life estimates, in which case, airbag inflator performance can be different than a desired or optimal operation of an airbag. While recommended replacement dates can be communicated to customers by labeling and/or generic maintenance reminders, it can be advantageous to disable the airbag function, after a specified period of usage condition or post-installation time.

Figure 5:
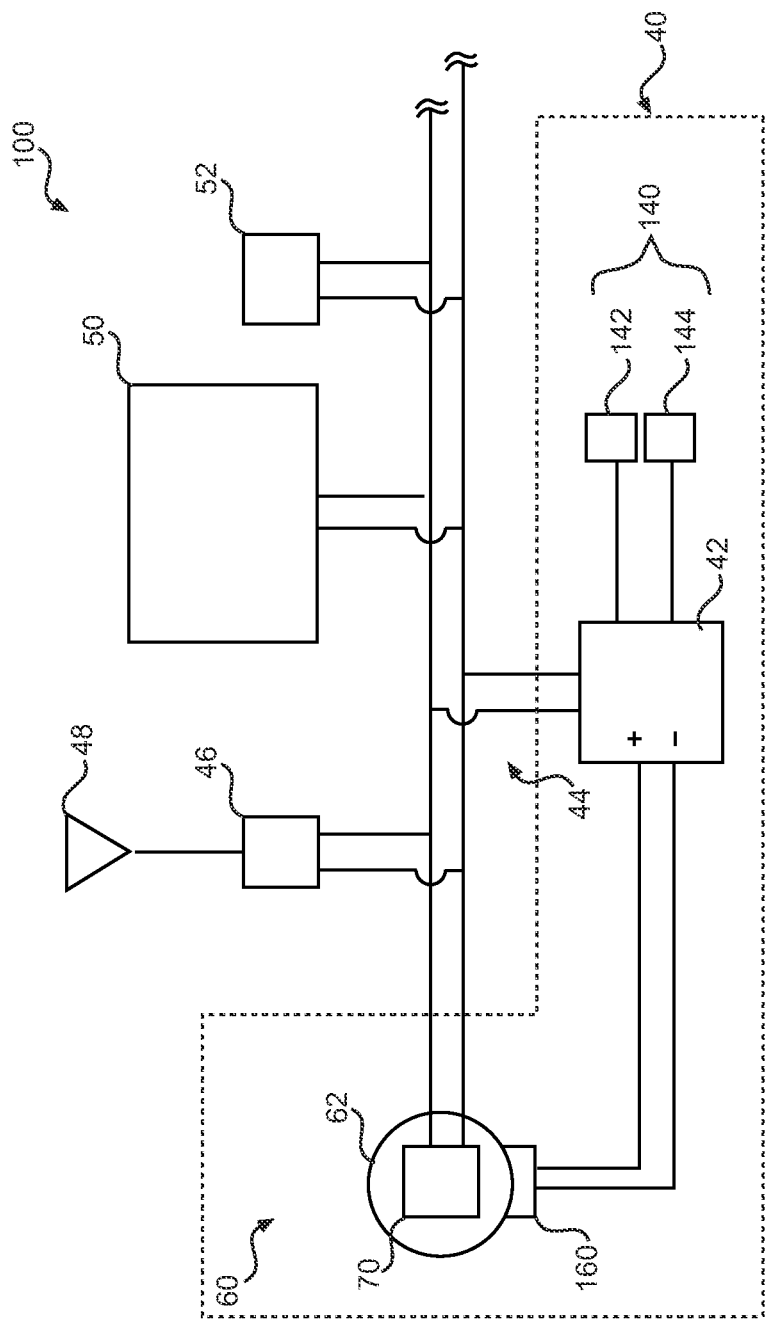
FIG. 5 is a schematic illustration of the supplemental restraint system of FIG. 1.

FIG. 5 schematically illustrates a monitoring apparatus 100 that can include an airbag inflator 62 and an electronic device 70 permanently affixed to the airbag inflator 62. The electronic device 70 (also referred to as a module controller 70) and the airbag inflator 62 can be components of an airbag module 60. The module controller 70 can be a processor based controller and can also be referred to as an electronic control unit (ECU), a central processing unit (CPU) or a microcomputer. The controller 70 can be programmed with a unique serial or lot number at the time of manufacture.

Each vehicle can have a unique identification number (VIN) that can indicate at least the manufacturer, model and date of manufacture. The monitoring apparatus 100 can advantageously use the VIN to determine whether the airbag module 60 is original equipment of the vehicle, or the airbag module 60 has been installed in the vehicle after the vehicle's date of manufacture. The controller 70 can log each vehicle identification number (VIN) which it has been associated with or installed onto along with a digital timestamp that can include a date and a time of the first association timing and the last association timing for a given VIN.

At power-on timing, the airbag module 60 can request VIN information from a vehicle using a command sent over a communication network or communication bus. The VIN information that is received from the vehicle can be compared to any pre-existing VIN information stored within the memory storage of the airbag module 60 to determine whether this is the first time the airbag module 60 has been installed onto a vehicle. In such an instance the airbag module 60 can initiate recording of the first VIN. The airbag module 60 can determine whether this is the first time it has been installed onto a vehicle by recognizing that there is no pre-existing VIN information stored within the memory storage of the airbag module 60. The airbag module 60 can also determine whether the VIN retrieved from the vehicle differs from any previously stored VIN information. And, the newer VIN can be added to the listing of prior VINs having been associated with the airbag module 60.

The airbag module 60 can use the serial or lot number of the airbag module 60 to calculate and log a time delta between an inflator manufacture date and the first associated VIN installation timing. This value can be understood as date of manufacture to date of first time usage. The airbag module 60 can calculate and log a time delta between inflator first associated VIN installation timing and a present associated VIN installation timing. This value can be understood as the time spent in usage by a customer or field exposure time.

The airbag module 60 can determine service life and acceptable usage electronically and can broadcast its state by broadcasting particular messages to the vehicle across a communication bus or network. A pre-expiration state, nearing expiration state, and an at-expiration state or post-expiration state can be communicated to the vehicle operator and/or a remote network. A percentage of life remaining or a percentage of life used can also be communicated to the vehicle operator and/or the remote network. The states can be determined by life calculations established by the manufacturer of the vehicle.

The information received by the airbag module 60 can be received by a main controller or an SRS controller 42 which can provide a firing pulse and judgements of ability to send the firing pulse. The information received by the airbag module 60 can be received by devices in the vehicle which give feedback to an operator or user of the vehicle. The information received by the airbag module 60 can be broadcast from the vehicle's telematics device 46 to report this information to a remote server for purposes of further communicating the information. Additionally, information can be made available to the vehicle's on-board diagnostic port 52, such that service facilities have the ability to acquire the information with diagnostic tools.

Figure 1:
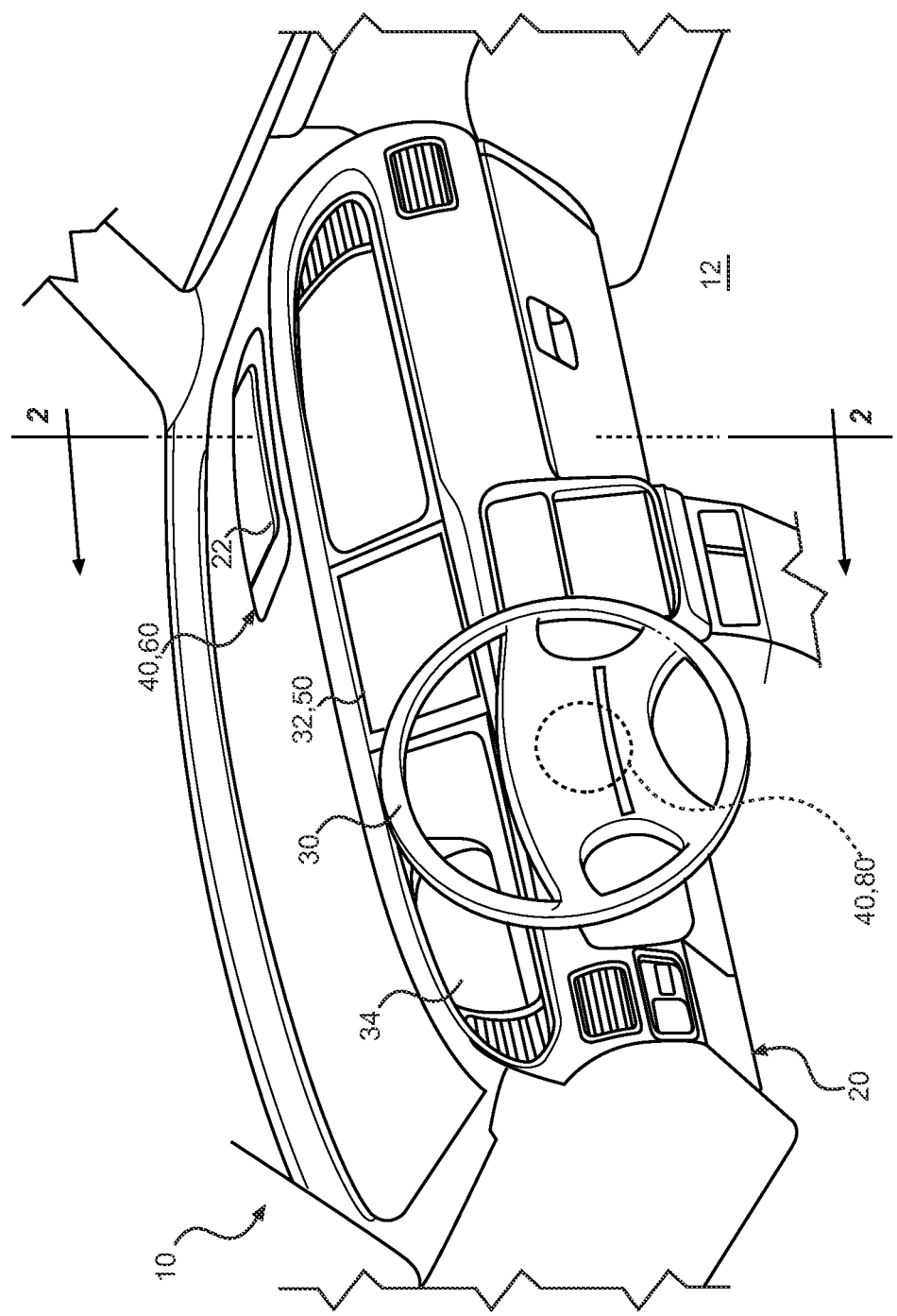
FIG. 1 is a perspective view of an instrumental panel of a vehicle including a supplemental restraint system made in accordance with principles of the disclosed subject matter.

FIG. 1 illustrates a perspective view of an instrument panel 20 mounted at a front end of a passenger compartment 12 in a vehicle 10. The vehicle 10 can include a supplemental restraint system 40 that includes the airbag module 60 mounted in the instrument panel 20 on a passenger side of the vehicle 10 and an airbag module 80 mounted in a steering wheel 30. Referring to FIG. 5, the supplemental restraint system 40 can include the SRS controller 42. The SRS controller 42 can be in electrical communication with the each of the airbag modules 60, 80. The airbag module 80 is omitted from FIG. 5 for clarity and simplicity of the drawing. As will be discussed in further detail, the monitoring apparatus 100 can include components of the supplemental restraint system 40 and the vehicle 10.

Figure 2:
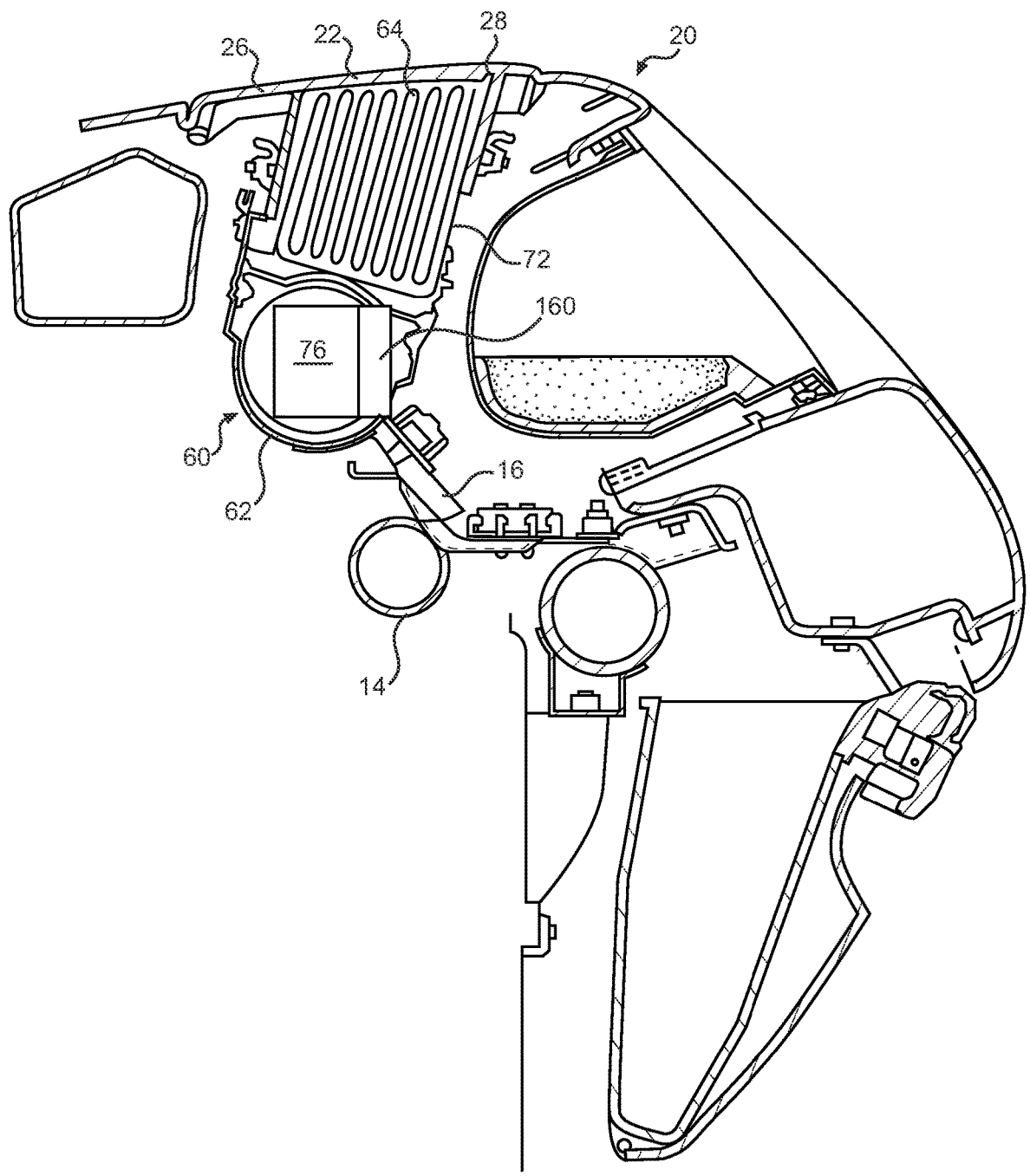
FIG. 2 is a cross-section view of the instrumental panel taken along line 2 of FIG. 1.

Each of the airbag modules 60, 80 can include an inflator, an airbag and a module controller. For brevity, further reference is made to the airbag module 60 with the understanding that the airbag module 80 can have equivalent structure and equivalent functions. Referring to FIGS. 1 and 2 collectively, the airbag module 60 can be included in an upper portion of the instrument panel 20 with a lid 22 mounted on an upper surface of the instrument panel 20. The lid 22 can cover the airbag module 60 and an opening in the instrument panel 20. The airbag module 60 can include an airbag 64 that opens the lid 22 as the airbag 64 inflates into its deployed position in the passenger compartment 12.

The vehicle 10 can include an infotainment system 32 and an instrument cluster 34 (also referred to as a combination meter) mounted in the instrument panel 20. The infotainment system 32 can include a display 50. The airbag module 60 can be in electrical communication with at least one of the display 50 and the instrument cluster 34. Any one of the display 50 and the instrument cluster 34 can display an alert signal or associated message therewith such that an occupant of the vehicle 10 can be made aware of operating conditions of the vehicle 10 and/or component parts of the vehicle 10. For example, the display 50 can notify a driver of the vehicle 10 when the inflator 62 of the airbag module 60 of the supplemental restraint system 40 is nearing the end of its service life. Thus, the monitoring apparatus 100 can include at least one of the display 50 and the instrument cluster 34.

Figure 3:
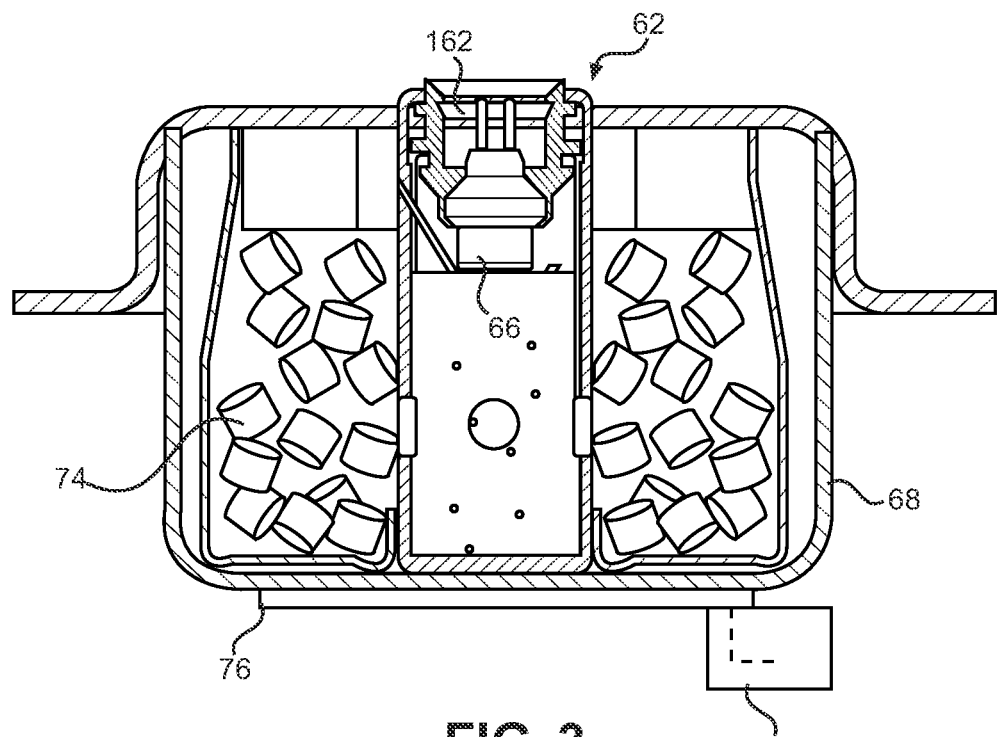
FIG. 3 is a cross-section view of an airbag module made in accordance with principles of the disclosed subject matter.

Referring to FIG. 2, a cross section of the instrument panel 20 taken along line 2-2 of FIG. 1 is shown. The instrument panel 20 can have the airbag module 60 disposed within. Referring to FIGS. 2 and 3 collectively, the airbag module 60 can include the inflator 62, an airbag 64 in the uninflated state attached to the inflator 62 and in fluid communication with the inflator 62, and the module controller 70 mounted on a circuit board 76 that is affixed to the inflator 62. The airbag module 60 can be supported through a bracket 16 on a frame pipe 14. The frame pipe 14 can extend in a transverse direction of the vehicle 10. The instrument panel 20 can include an airbag accommodation vessel 72 that contains the airbag 64 in a folded state.

The inflator 62 can include a housing 68 coupled to the bracket 16. The airbag accommodation vessel 72 can be coupled to an upper portion of the housing 68, and the lid 22 coupled to the airbag accommodation vessel 72. The lid 22 can cover an opening at an upper surface of airbag accommodation vessel 72 and in an upper surface of the instrument panel 20.

The inflator 62 can include a propellant contained within the housing 68 The propellant can be burnt to generate a high pressure gas by firing a squib contained in the housing 68 in response to a pulse signal from the SRS controller 42. The airbag 64 can be housed in a folded state within the airbag accommodation vessel 72 and can be in fluid communication with the inflator 62 and can be inflated by the high pressure gas generated by the inflator 62. Referring to FIG. 2, the lid 22 can include a hinge portion 26 and a fracture portion 28. When a pressure sufficient to inflate the airbag 64 is applied, the fracture portion 28 is broken to pivot and open the lid 22 about the hinge portion 26, and the airbag 64 is deployed into the passenger compartment 12 through an opening formerly closed by the lid 22.

Figure 4:
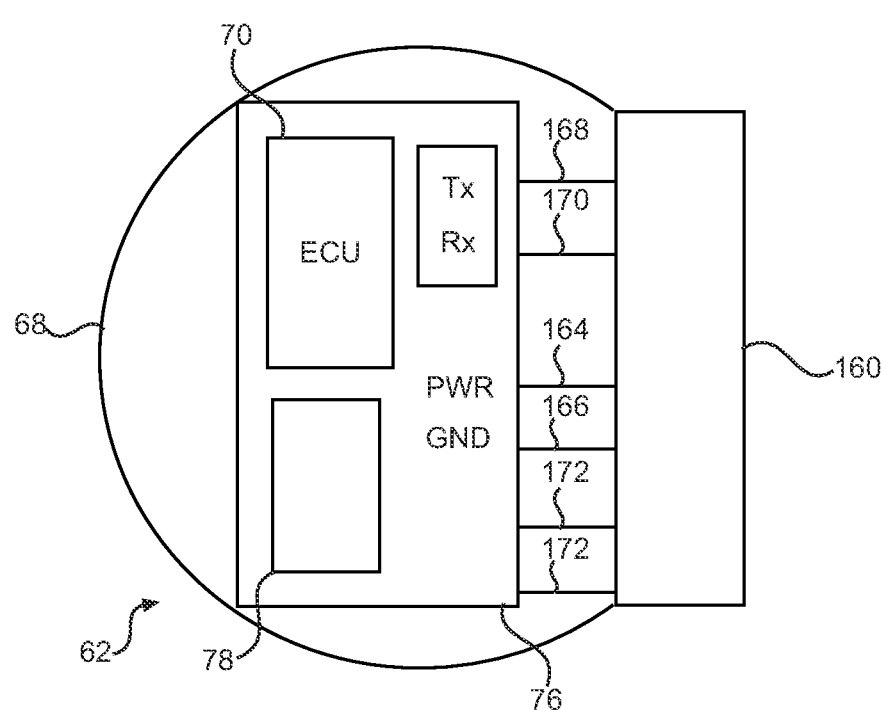
FIG. 4 is an end view of the airbag module of FIG. 3.

FIG. 3 is a cross-sectional view of the inflator 62 and schematically illustrates a circuit board 76 and a module connector 160. The airbag 64 has been omitted from FIG. 3 for clarity and simplicity of the drawing. Referring to FIGS. 3 and 4 collectively, the module controller 70 and the module connector 160 can be mounted on the circuit board 76. The housing 68 can be any shape to accommodate positioning within a vehicle 10 where supplemental restraint systems are located. For example, as shown in FIG. 3, the housing 68 can have a squat cylindrical shape that is configured for use with the airbag module 80 that is to be mounted a steering wheel 30 of the vehicle 10. Alternatively, the inflator 62 can be an elongated cylinder as compared to FIG. 3, which shape is configured for use with the airbag module 60 mounted in the instrument panel 20.

The airbag 64 can be attached to the housing 68 and in fluid communication with the inflator 62 such that when the airbag 64 is inflated by the inflator 62, a portion of the airbag 64 can remain attached to the housing 68 and the inflated portion of the airbag 64 can deploy into the passenger compartment 12 of the vehicle 10. The airbag 64 can be in fluid communication with the inflator 62.

The inflator 62 can include an ignitor 66 (also referred to as a squib) and chemical reactants 74 and can be disposed within the housing 68. The inflator 62 can be in electrical communication with the SRS controller 42. The inflator 62 can be connected to the communication network 44 of the vehicle 10. The inflator 62 can receive signals from the SRS controller 42. For example, the SRS controller 42 can send a pulse signal to fire which can cause the ignitor 66 of the inflator 62 to fire and ignite the chemical reactants 74 within. The chemical reactants 74 can be a pyrotechnic material. The airbag 64 can inflate with gas created from a chemical reaction caused by ignitor 66 firing and igniting chemical reactants 74. The chemical reactant 74 can be any substance known to one of ordinary skill in the art for use as a propellant and gas generating substance.

The circuit board 76 can be disposed on an outer surface of a lower portion of the housing 68 or any other appropriate location on the inflator 62. The circuit board 76 can be in electrical communication with the SRS controller 42. A memory storage 78 can be mounted on the circuit board 76 and can be in electrical communication with the module controller 70.

Referring to FIG. 4, the module connector 160 can be connected to the circuit board 76 and in electrical communication with the circuit board 76 and configured to connect to a communication network 44 of the vehicle 10. The module connector 160 can include a plurality of leads and can include at least a power lead 164 that connects to a power source within the vehicle 10, a ground lead 166 that connects to a ground line of the vehicle 10, a transmission lead 168 that transmits signals to the communication network 44, and a receiver lead 170 that receives signals from the communication network 44, and a pair of diagnostic/engineering leads 172 that are in electrical communication with the diagnostic port 52. The transmission lead 168 and receiver lead 170 can be connected to a communication network 44 of the vehicle 10 and directly or indirectly connect to the SRS controller 42.

The memory storage 78 can be a RAM storage configured to store one or more vehicle identification number(s) (VIN) that have been associated with the airbag module 60. The memory storage 78 can store timestamps for each VIN that the airbag module 60 has been associated with. A timestamp can include a date and a time and the memory storage 78 can store a timestamp for a first association with a VIN and a last association with a VIN. The module controller 70 can be in electrical communication with the memory storage 78 and can retrieve any of the stored VINs and/or timestamps. The module controller 70 can record to the memory storage 78 a VIN and associated timestamp and the module controller 70 can retrieve from the memory storage 78 previously stored VINs and associated timestamps.

Referring to FIGS. 3 and 4, the module controller 70 can be mounted on the circuit board 76 and can be in electrical communication with any of the memory storage 78, the SRS controller 42, the display 50, and the telematics device 46. The module controller 70 can be configured to send and receive signals to and from the SRS controller 42. The module controller 70 can send signals to the display 50 and/or a telematics device 46 directly via the communication network 44 or indirectly via instructions to the SRS controller 42.

The signals sent by the module controller 70 can include a disable signal(s), alert signal(s), status signal(s), signal(s) including a message, command signal(s), and any other type of signal that pertains to the status of the airbag module 60 and can be communicated to an operator and or service technician of the vehicle 10. For example, the module controller 70 can send a disable signal D, a first alert signal S1, and a second alert signal S2. Any of the signals output by the module controller 70 can include identification data including a location of the airbag module 60 associated with the module controller 70 such that the SRS controller 42 can locate the airbag module 60 from a plurality of airbag modules of the supplemental restraint system 40 in the vehicle 10.

Examples of status signals can include, but are not limited to, active and inactive. Examples of alert signals can include, but are not limited to, pre-expiration state, nearing expiration state, at-expiration state, and post-expiration state. An example of a signal including a message can include, but is not limited to, "airbag module nearing expiration state: contact authorized service department;" "airbag module past end of service life: airbag disabled, contact authorized technician immediately;" and "airbag service life expires in one week." An example of a command signal can include, but is not limited to, a command to the SRS controller 42 to disable the firing command for the inflator 62 of the airbag module 60.

Referring to FIG. 5, the supplemental restraint system 40 can include sensors 140. The SRS controller 42 can be electrically connected to the inflator 62 of the airbag module 60, the module controller 70, the display 50, the telematics device 46, and the sensors 140. The SRS controller 42 can be separately connected to each of the module controller 70 and the inflator 62. The SRS controller 42 can be configured to determine an inflation event based on an impact sensor data. The impact sensor data can include data from any of the sensors 140. The SRS controller 42 can be configured to output a firing pulse to the inflator 62 when an inflation event is determined.

The telematics device 46 can be connected to the communication network 44 and can be configured to broadcast signals including, but not limited to, the disable signal D, the first alert signal S1, and the second alert signal S2. The telematics device 46 can communicate signals, data and/or messages sent from either the SRS controller 42 or the module controller 70 to a remote server. For example, the remote server can be a server belonging to service station for the vehicle 10, a mobile application associated with the vehicle 10, a server belonging a manufacturer of the vehicle 10, or any other server that may receive information about the service life of any of the airbag modules (for example, airbag modules 60, 80) of the supplemental restraint system 40. The telematics device 46 can include an antenna 48. The telematics device 46 can be a separate device specifically for sending signals associated with the supplemental restraint system 40 or the telematics device 46 can be integrated into other telematics systems of the vehicle 10, such as, but not limited to a global positioning system or other appropriate wireless communication device.

The telematics device 46 can be configured to transmit a notification signal that includes any one of the disable signal D, the first alert signal S1 and the second alert signal S2 in combination with any stored data in the memory storage 78 and/or other data storage device of the vehicle 10. The stored data can include but is not limited to a unique serial number of the inflator 62, a unique lot number of the inflator 62, a unique serial number of the monitoring apparatus 100, a unique lot number of the monitoring apparatus 100, each stored VIN and timestamp data for each stored VIN. Alternate embodiments of the notification signal can include data that indicates that any one of the disable signal D, the first alert signal S1 and the second alert signal S2 has been issued instead of the actual one of the signals D, S1, S2.

The display 50 can be connected to the communication network and can be configured to display a message associated with a signal including, but not limited to, the disable signal D, the first alert signal S1, and the second alert signal S2. The display 50 can include any structure that is capable of communicating a signal, message, or indicator to a user, occupant, or service technician associated with the vehicle 10. The display 50 can be provided in the instrument panel 20 of the vehicle 10. The display 50 can be included as part of the infotainment system 32 provided on the instrument panel 20. Alternatively, the display 50 can be a separate display on the instrument panel 20. The display 50 can be a liquid crystal display (LCD), digital touch screen, or any other appropriate display for providing an interface for an occupant of the vehicle to interact with.

The sensors 140 can include any number of sensors in the vehicle that can be used to determine whether to send a firing pulse to the inflator 62 of the airbag module 60. Examples of the sensors 140 can include, but are not limited to, an accelerometer 142 and a proximity sensor 144. The sensors 140 can send a signal to the SRS controller 42 to indicate that an impact event has occurred or will be imminent and to deploy appropriate ones(s) of the airbag modules (for example airbag modules 60, 80) of the supplemental restraint system 40 of the vehicle 10.

The diagnostic port 52 can be a vehicle's on-board diagnostic port that can be configured such that a service facility can display a status, signal(s), or message output by the module controller 70 and/or the SRS controller 42 using a diagnostic tool connected to the diagnostic port 52. The diagnostic/engineering leads 172 can be in electrical communication with the diagnostic port 52.

Figure 6:
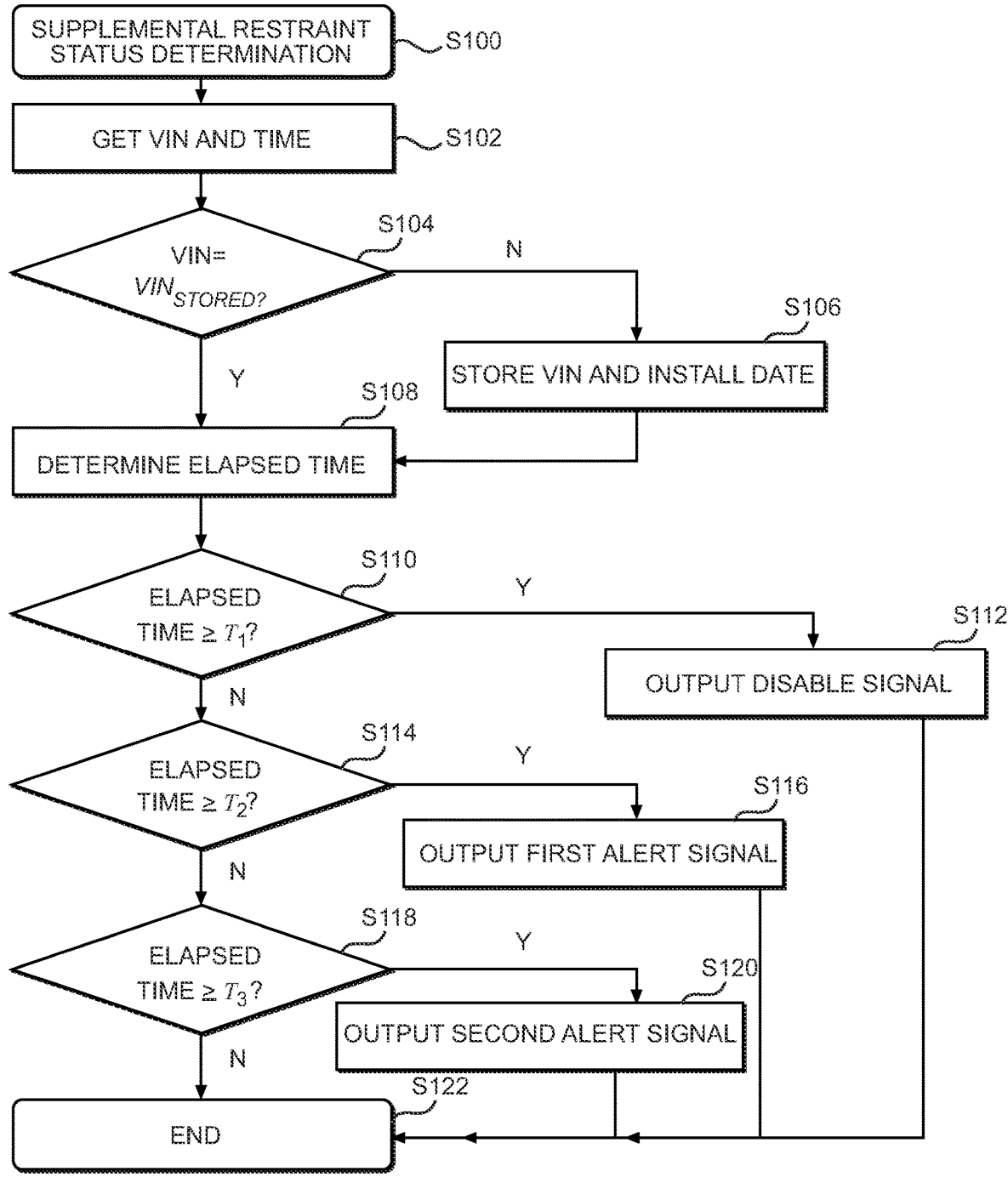
FIG. 6 is a flowchart depicting an exemplary algorithm useable by the supplemental restraint system of FIG. 1.

FIG. 6 illustrates an exemplary algorithm that the module controller 70 can follow in order to determine the state of each of the airbag modules of the supplemental restraint system 40 of the vehicle 10. The exemplary algorithm can occur when the vehicle 10 is started. The module controller 70 can begin the supplemental restraint system state determination at step S100. Then the module controller 70 can proceed to step S102.

At step S102, the module controller 70 can request an identification information from the vehicle 10. The identification information can be a vehicle identification number (VIN) or any other unique identification that is associated with the vehicle 10. The module controller 70 can request the VIN for the vehicle 10 from any other storage device on the vehicle 10 capable of storing the VIN, or from the SRS controller 42, or from any other appropriate controller or device of the vehicle 10 that has access to a storage device storing the VIN or built-in capability to store the VIN. The module controller 70 can receive the VIN over the communication network 44 of the vehicle 10 or directly or indirectly from any of the storage devices or controllers having the VIN. The module controller 70 can additionally request a first installation time and a last association time associated with a stored VIN. The time can be in the form of a timestamp that includes a date and time. The module controller 70 can then proceed to step S104.

At step S104 the module controller 70 can determine whether vehicle identification information has been previously stored. The module controller 70 can check to see if there is a stored VIN and whether the stored VIN matches the received VIN that the module controller 70 requested from the vehicle 10 in step S102. The module controller 70 can check the memory storage 78 for a stored VIN or any other storage device or internal memory associated with the airbag module 60 for a stored VIN. The module controller 70 can determine whether the received VIN of the vehicle differs from the stored VIN. The stored identification information can be one VIN or it can be a plurality of VINs with which the airbag module 60 has been associated. The module controller 70 can compare the received VIN to each one of the plurality of stored VINs.

A default value can be stored as a default VIN in the memory device 78 during the manufacture of the airbag module. The default VIN can indicate that the airbag module 60 has yet to be installed in a vehicle since the manufacture of the airbag module 60. The default VIN can be a value indicating that there is no stored VIN associated with the airbag module 60, such as a null value or a zero.

When none of the stored VIN(s) is equal to the VIN that was received from the vehicle 10, the module controller 70 can proceed to step S106. When any one of the stored VINs is equal to the VIN from the vehicle 10, the module controller 70 can proceed to step S108.

At step S106, the module controller 70 can determined whether the VIN for the vehicle 10 is the first VIN associated with the airbag module 60. For example, the module controller 70 can be configured to check a flag value at step S106. If the flag value is ON, then the VIN of the vehicle 10 is the first VIN associated with the airbag module 60. Since the VIN of the vehicle 10 is a new VIN, the module controller 70 can be configured to change the flag value from ON to OFF. The module controller 70 can record the VIN of the vehicle 10 and the date as a timestamp of the first installation associated with the VIN of the vehicle 10. The module controller 70 can record the VIN and timestamp in the memory storage 78 of the airbag module 60 or any other storage device or internal memory associated with the airbag module 60.

If the flag value is OFF, then the module controller 70 can be configured to tag or otherwise identify the VIN from the vehicle 10 as an subsequent installation in the vehicle 10. That is, the module controller 70 can be configured to determine that the airbag module 60 has been installed in more than one vehicle. The module controller 70 can be configured to record a number associated with the VIN from the vehicle 10 that corresponds to the number of times the airbag module 60 has been installed in a different vehicle.

The module controller 70 can then proceed to step S108.

At step S108 the module controller 70 can determine an elapsed time E. The elapsed time E can be the elapsed service time of the inflator 62. The module controller 70 can calculate a time delta corresponding to the elapsed time of the airbag module 60 based on a manufacture date of inflator 62 and any associated VINs with which the airbag module 60 has stored in the memory storage 78.

Since the service life of the airbag module 60 can change based on environmental conditions, it can be beneficial to record the environmental conditions, such as but not limited to temperature and humidity. However, until the airbag module 60 is first installed on a vehicle, environmental data collection might not be available. It is possible that the manufacturer of the airbag module 60 can record the environmental data onto the memory device 60. Alternatively, the manufacture of the airbag moducle 60 could maintain the airbag module 60 in a controlled environment such that any change in the service life of the airbag module 60 can be predicted or reliably estimated. Thus, the elapsed time E can include multiple time deltas. An elapsed time E that includes multiple time deltas can account for different conditions that may affect the service life of the inflator 62 or the airbag module 60 differently. For example, the elapsed time E can include a first time delta that can be calculated as the time between inflator 62 manufacture date and the first installation date.

The elapsed time E can include a second time delta that can be calculated as the time between the first associated VIN installation timing and the installation timing associated with the VIN of the vehicle 10. The second time delta can correspond to a change in service life that is variable and depends on environmental factors such as, but not limited to, temperature and humidity. Once the module controller 70 calculates the time delta(s) and determines the elapsed time E, the module controller 70 can proceed to step S110. The module controller 70 can be configured to execute any appropriate calculation or algorithm that can reliably determine a change in the service life of the airbag module 60.

At step S110 the module controller 70 can compare the elapsed time E to a first time threshold T1. The first time threshold T1 can be a predetermined time threshold. The first time threshold T1 can be a constant time threshold or a variable time threshold. The first time threshold T1 can correspond to a time at which the airbag module 60 is at an expiration state. The expiration state can correspond to the end of the service life of the airbag module 60. When the elapsed time E is greater than or equal to the first time threshold T1, the module controller 70 can proceed to step S112. When the elapsed time E is less than the first time threshold T1, the module controller 70 can proceed to step S114.

At step S112, the module controller 70 can output a disable signal D. The disable signal D can be sent to the SRS controller 42. The disable signal D can command the SRS controller 42 to disable the firing pulse command for the inflator 62 of the airbag module 60. The disable signal D can include an alert or message that can be displayed by the display 50 and/or broadcast by the telematics device 46. The module controller 70 can send the disable signal D directly or indirectly to the SRS controller 42, the display 50, the telematics device 46, or any other device connected to the vehicle's communication network 44 that can utilize the signal to notify an occupant or service technician that the airbag module 60 is at or post-expiration. The disable signal D can also include a status signal that the airbag module 60 is at or post-expiration state. The module controller 70 can then proceed to step S122 and exit the supplement restraint status determination subroutine.

At step S114, the module controller 70 can compare the elapsed time E to a second time threshold T2. The second time threshold T2 can be a predetermined time threshold. The second time threshold T2 can be a constant time threshold or a variable time threshold. The second time threshold T2 can correspond to a time at which the airbag module 60 is nearing an expiration state. The second time threshold T2 can be less than the first time threshold T1. Nearing the expiration state can be any time that precedes the end of the service life of the airbag module 60 but gives the occupant or driver of the vehicle a limited window of time before reaching expiration state. For example, nearing expiration state could be when the airbag module 60 has predetermined number of hours remaining before the end of the service life. Nearing expiration state could be based on an estimate of one month of drive time remaining before the end of the service life of the airbag module 60. The nearing expiration state can be any amount of time sufficient to allow the vehicle to be taken to an authorized service technician before the end of the service life of the airbag module 60. When the elapsed time E is greater than or equal to the second time threshold T2, the module controller 70 can proceed to step S116. When the elapsed time E is less than the second time threshold T2, the module controller 70 can proceed to step S118.

At step S116, the module controller 70 can output a first alert signal S1. The module controller 70 can send the first alert signal S1 directly or indirectly to the SRS controller 42, the display 50, the telematics device 46, or any other device connected to the vehicle's communication network that can utilize the first alert signal S1 to notify an occupant or service technician that the airbag module 60 is nearing the end of the service life. The module controller 70 can then proceed to step S122.

At step S118, the module controller 70 can compare the elapsed time E to a third time threshold T3. The third time threshold T3 can be a predetermined time threshold. The third time threshold T3 can be a constant time threshold or a variable time threshold. The third time threshold T3 can correspond to a time at which the airbag module 60 is in a pre-expiration state. The third time threshold T3 can be less than the second time threshold T2. The pre-expiration state can be a state in which the airbag module 60 will sometime in the future enter the nearing expiration state. For example, the pre-expiration state can be when there are predetermined number of hours remaining in the service life of the airbag module 60 that is greater than the number of the near expiration state of the airbag module 60. The third time threshold T3 can be any time sufficient to allow the pre-expiration state of the airbag module 60 to occur sufficient to notify an occupant, driver, or service technician that within a certain window of time, the nearing expiration state will occur. When the elapsed time E is greater than or equal to the third time threshold T3, the module controller 70 can proceed to step S120. When the elapsed time E is less than the third time threshold T3, the module controller 70 can proceed to step S122.

At step S120, the module controller can output a second alert signal S2. The module controller 70 can send the second alert signal S2 directly or indirectly to the SRS controller 42, the display 50, the telematics device 46, or any other device connected to the vehicle's communication network that can utilize the second alert signal S2 to notify an occupant or service technician that the airbag module 60 is in the pre-expiration state of the service life. The module controller 70 can then proceed to step S122.

At step S122 the module controller 70 can end the algorithm.

Alternatively, instead of with the SRS controller 42, the sensors 140 can be in electrical communication with an additional controller (not illustrated) that is different from the SRS controller 42. This additional controller can be in electrical communication with the SRS controller 42. This additional controller can be configured to receive processed data from the sensors 140 or to receive the raw data from the sensors 140 and process the raw data to indicate an inflation event. Then, this additional controller can electrically communicate the processed data to the SRS controller 42.

Electrical communication lines (not numbered) can connect the module controller 70 to the SRS controller 42, the telematics device 46, and the display 50 in any appropriate manner. Electrical communication can be either one-way communication or two-way communication and can be networked or not networked. The SRS controller 42 also can be referred to as an electronic control unit (ECU) or as a central processing unit. The module controller 70, the SRS controller 42, and the sensors 140 can be configured with hardware, with or without software, to perform the assigned task(s). The sensors 140 can be configured as a smart sensor such that the sensors 140 can process the raw data collected by the sensors 140 prior to transmission to the SRS controller 42 or the sensors 140 can be configured as a simple sensor that passes the raw data directly to the SRS controller 42 without any manipulation of the raw data. The module controller 70 and the sensors 140 can be configured to send data to the SRS controller 42, with or without a prompt from the SRS controller 42.

Alternative Embodiments

While certain embodiments of the invention are described above, it should be understood that the invention can be embodied and configured in many different ways without departing from the spirit and scope of the invention.

For example, embodiments are disclosed above in the context of an airbag module having an airbag module 60, 80 mounted in an instrument panel 20 or a steering wheel 30 in the front of a vehicle as shown in FIG. 1. However, alternate embodiments can include an airbag module mounted at any appropriate location in the vehicle 10. For example, the airbag module can be located in the doors, side panels, vehicle pillars, above or near windows, and beneath the instrument panel.

Exemplary embodiments can include the circuit board 76 and module connector 160 integrated as part of the inflator connector 162 to the communication network 44 and to the SRS controller 42.

Exemplary embodiments can include any type of supplemental restraint system and/or airbag. In other words, exemplary embodiments can include applications of supplemental restraint systems in other vehicles and is not limited to automobiles. For example, alternate embodiments can cover supplemental restraint systems in buses, planes, boats, motorcycles, off-road vehicles, trucks, all-terrain vehicles, snowmobiles, etc.

Exemplary embodiments can include the execution of steps S104 to S120 of the exemplary algorithm by the module controller 70 in any order relative to one another. Any of the steps S114 to S120 can be omitted, as desired.

Some of the disclosed embodiments can include time thresholds. The time thresholds can be variable and can be changed as desired. For example, a buffer period can be included in the time thresholds. Instead of the first time threshold T occurring at the end-of-service life of the inflator 62 in the airbag module 60, the first time threshold T could represent a predetermined number of hours before the end-of-service life. Such a buffer period could allow sufficient time for the operator of the vehicle to take it to a certified service location before the end-of-service life. Alternatively, there can be other intermediate time thresholds between the time thresholds in the exemplary embodiments. For example, there could be time thresholds that count down and issue alert signals with associated messages to the display 50 as the end-of-service life approaches.

Exemplary embodiments contemplate the exemplary algorithm can start when the vehicle 10 is turned on. Alternative embodiments can begin the algorithm at other times such as but not limited to, at periodic time intervals, weekly, monthly, any time the airbag module 60 receives power from a power supply, etc.

Some of the disclosed embodiments include components that can be in electrical communication with each other. Components in electrical communication can be directly or indirectly connected through electrical communication lines. The components can also be connected wirelessly through a communication network of the vehicle or other network having wireless connection capabilities.

Some of the disclose embodiments include the module controller 70 outputting signals to other components such as but not limited to the SRS controller 42, the telematics device 46, the display 50, and the vehicle's onboard diagnostic port 52. Alternatively, these components can request or retrieve signals from the module controller 70. The module controller 70 can output signals directly to any of the components in the vehicle that it is in electrical communication with or alternatively it can output the signal to a main controller, or the SRS controller 42, which can then send the signal to the telematics device 46, the display 50, the onboard diagnostic port 52, or any other component part connected to the vehicle's communication network and/or the SRS controller. The SRS controller 42 can be considered the main controller of the vehicle or there can be a main controller separate from the SRS controller 42.

What is claimed is:

1. An airbag module for a supplemental restraint system of a vehicle, the vehicle having identification information, the supplemental restraint system having a SRS controller, the airbag module comprising:
an inflator;
an airbag attached to the inflator and in fluid communication with the inflator; and
a module controller mounted to the inflator, the module controller configured to:
determine an elapsed service time of the inflator based on the identification information of the vehicle;
compare the elapsed service time to a first time threshold; and
output a disable signal to the SRS controller commanding the SRS controller to disable output of a firing pulse for the inflator when the elapsed service time is greater than or equal to the first time threshold.

2. The airbag module of claim 1, wherein the module controller is further configured to:
compare the elapsed service time to a second time threshold that is different than the first time threshold; and
output a first alert signal when the elapsed service time is greater than or equal to the second time threshold and less than the first time threshold.

3. The airbag module of claim 2, wherein the module controller is further configured to:
compare the elapsed service time to a third time threshold that is different than each of the first time threshold and the second time threshold; and
output a second alert signal when the elapsed service time is greater than or equal to the third time threshold and less than the second time threshold, the second alert signal is different than the first alert signal.

4. The airbag module of claim 1, further comprising:
an information storage device in electrical communication with the module controller, wherein
the module controller is further configured to record the identification information of the vehicle in the information storage device when a flag has a default value, and
subsequently change the flag to a value that is different from the default value.

5. The airbag module of claim 4, wherein the module controller is further configured to,
compare the identification information of the vehicle to each identification information previously stored in the information storage device when the flag has a value that is different from the default value; and
record the identification information of the vehicle when the identification information of the vehicle differs from each identification information previously stored in the information storage device.

6. The airbag module of claim 5, wherein the identification information of the vehicle previously stored in the information storage device includes a plurality unique identifiers, each unique identifier corresponds to a respective one of a plurality of unique vehicles.

7. A monitoring apparatus for a supplemental restraint system for a vehicle, the vehicle including a communication network and identification information, the monitoring apparatus comprising:
an inflator;
an airbag attached to the inflator and in fluid communication with the inflator;
a SRS controller in electrical communication with the inflator and configured to:
determine an inflation event based on an impact sensor data; and
output a firing pulse to the inflator when the inflation event is determined; and
a module controller mounted to the inflator and in electrical communication with the SRS controller through the communication network, the module controller configured to:
determine an elapsed service time of the inflator based on the identification information of the vehicle;
compare the elapsed service time to a first time threshold; and
output a disable signal to the SRS controller commanding the SRS controller to disable output of the firing pulse for the inflator when the elapsed service time is greater than or equal to the first time threshold.

8. The monitoring apparatus of claim 7, wherein the module controller is further configured to:
compare the elapsed service time to a second time threshold that is different than the first time threshold; and
output a first alert signal when the elapsed service time is greater than or equal to the second time threshold and less than the first time threshold.

9. The monitoring apparatus of claim 8, wherein the module controller is further configured to:
compare the elapsed service time to a third time threshold that is different than each of the first time threshold and the second time threshold; and
output a second alert signal when the elapsed service time is greater than or equal to the third time threshold and less than the second time threshold, the second alert signal is different from the first alert signal.

10. The monitoring apparatus of claim 9, further comprising:
a telematics device connected to the communication network and configured to broadcast each of the disable signal, the first alert signal, and the second alert signal;
a display connected to the communication network and configured to display a message associated with each of the disable signal, the first alert signal, and the second alert signal, and wherein
the module controller is further configured to:
output the disable signal to each of the SRS controller, the telematics device, and the display when the elapsed service time is greater than or equal to the first time threshold,
output the first alert signal to each of the SRS controller, the telematics device, and the display when the elapsed service time is greater than or equal to the second time threshold and less than the first time threshold, and
output the second alert signal to each of the SRS controller, the telematics device, and the display when the elapsed service time is greater than or equal to the third time threshold and less than the second time threshold.

11. The monitoring apparatus of claim 10, further comprising:
an information storage device in electrical communication with the module controller, wherein
the module controller is further configured to,
record the identification information of the vehicle in the information storage device when a flag is ON, and subsequently change the flag to OFF;

compare the identification information of the vehicle to each identification information previously stored in the information storage device when the flag is OFF;

record the identification information of the vehicle when the identification information of the vehicle differs from each identification information previously stored in the information storage device.

12. The monitoring apparatus of claim 7, further comprising:

a telematics device connected to the communication network and in electrical communication with the module controller through the communication network, wherein the module controller is configured to output the disable signal to the telematics device, and the telematics device is configured to broadcast a notification signal when the telematics device receives the disable signal.

13. The monitoring apparatus of claim 12, further comprising:

a display connected to the communication network and configured to display a message associated the disable signal, wherein the module controller is further configured to output the disable signal to each of the telematics device and the display when the elapsed service time is greater than or equal to the first time threshold.

14. The monitoring apparatus of claim 7, further comprising:

a display connected to the communication network and in electrical communication with the module controller through the communication network, wherein the module controller is further configured to output the disable signal to the display, and the display is configured to display a message indicating that the inflator is disabled when the display receives the disable signal.

15. The monitoring apparatus of claim 7, further comprising:

an information storage device in electrical communication with the module controller, wherein the module controller is further configured to record the identification information of the vehicle in the information storage device when a flag has a default value, and subsequently change the flag to a new value that is different from the default value.

16. The monitoring apparatus of claim 15, wherein the module controller is further configured to, compare the identification information of the vehicle to each identification information previously stored in the information storage device when the flag has a value that is different from the default value; and record the identification information of the vehicle when the identification information of the vehicle differs from the identification information previously stored in the information storage device.

17. The monitoring apparatus of claim 7, wherein the disable signal includes data identifying the module controller, and the SRS controller is configured to determine a location of the airbag from among a plurality of airbags.

18. A method of determining the state of an inflator of a supplemental restraint in a vehicle, the vehicle having an identification information, the method comprising:

determining an elapsed service time of the inflator based on the identification information of the vehicle;

comparing the elapsed service time to a first time threshold; and outputting a disable signal to an SRS controller commanding the SRS controller to disable a firing pulse for the inflator when the elapsed service time is greater than or equal to the first time threshold.

19. The method of claim 18, further comprising:

comparing the elapsed time to a second time threshold that is different than the first threshold;

comparing the elapsed time to a third time threshold that is different than each of the first threshold and the second threshold;

outputting a first alert signal when the elapsed service time is greater than or equal to the second time threshold and less than the first time threshold; and outputting a second alert signal when the elapsed service time is greater than or equal to the third time threshold and less than the second time threshold, the second alert signal is different than the first alert signal.

20. The method of claim 18, further comprising:

determining whether vehicle identification information has been previously stored;

recording the identification information of the vehicle when there is no previously stored identification information;

comparing the identification information of the vehicle to a previously stored identification information when vehicle identification information has been previously stored;

recording the identification information of the vehicle when the previously stored identification information is a default value;

recording the identification information of the vehicle when the previously stored identification information differs from the identification information of the vehicle;

recording a respective start time subsequent to recording the identification information of the vehicle; and determining the elapsed time based on the respective start time.

* * * * *